United States Patent [19]
Day

[11] Patent Number: 4,693,206
[45] Date of Patent: Sep. 15, 1987

[54] SELF-SEATING TONING SHOE FOR ELECTROSTATIC DRUM PRINTERS

[75] Inventor: Gene F. Day, Cupertino, Calif.

[73] Assignee: Precision Image Corporation, Redwood City, Calif.

[21] Appl. No.: 861,521

[22] Filed: May 9, 1986

Related U.S. Application Data

[63] Continuation-in-part of Ser. No. 796,872, Nov. 12, 1985, Pat. No. 4,655,165, which is a continuation-in-part of Ser. No. 763,040, Aug. 6, 1985.

[51] Int. Cl.$^4$ ............................................. B05B 5/02
[52] U.S. Cl. .................................... 118/631; 118/651; 118/660; 118/662
[58] Field of Search ............... 118/660, 629, 630, 631, 118/647, 651, 662

[56] References Cited

U.S. PATENT DOCUMENTS 3,752,119  8/1973  Matkan ................................. 118/660

*Primary Examiner*—Bernard D. Pianalto

[57] ABSTRACT

A toner applicator assembly for electrostatic drum printers featuring a toning shoe with a biasing mechanism in which the toning shoe is biased only at a single point. The toning shoe scans a sheet having an electrostatic latent image supported on a rotating drum, in a helical path, and applies liquid developer to the sheet to develop the latent image. The toning shoe has a normal orientation which is skewed with respect to the drum's rotation axis so as to follow a helical path. The toning shoe is movable with respect to three degrees of freedom relative to the normal orientation so as to automatically adjust its orientation to match the orientation of the sheet. The biasing mechanism comprises a base fixed relative to the drum, a lever body pivotally mounted to the base, a pin mounted on an end of the lever body and engaging a detent in the back of the shoe, and a spring connected to both the base and the end of the lever body opposite from the pin. The spring provides torque to cause the pin to push against the shoe. The toning shoe is loosely secured to the base by partially inserted screws which limit the shoe's forward movement.

23 Claims, 7 Drawing Figures

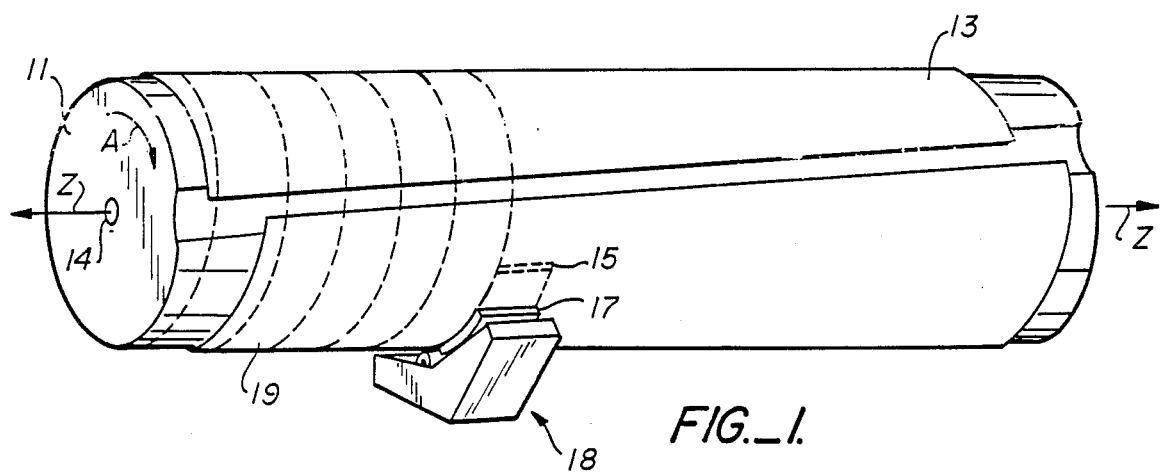
FIG._1.
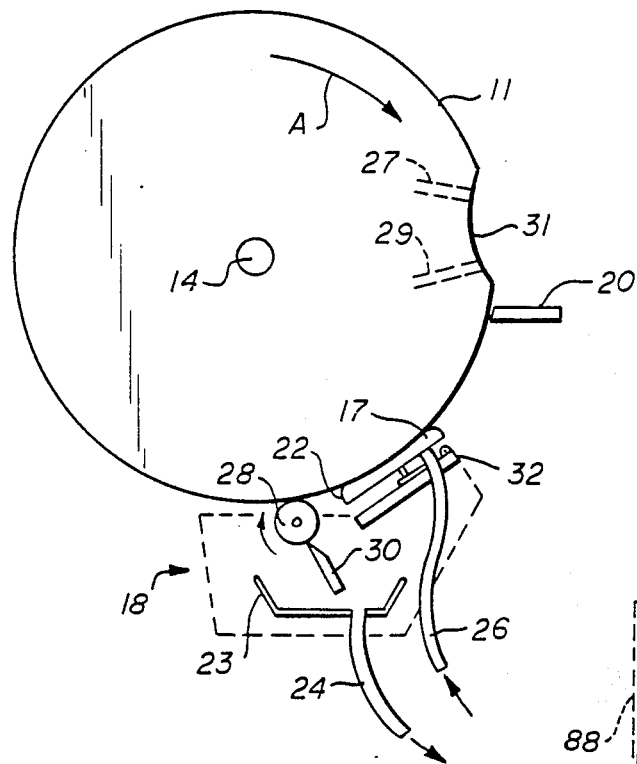
FIG._2.
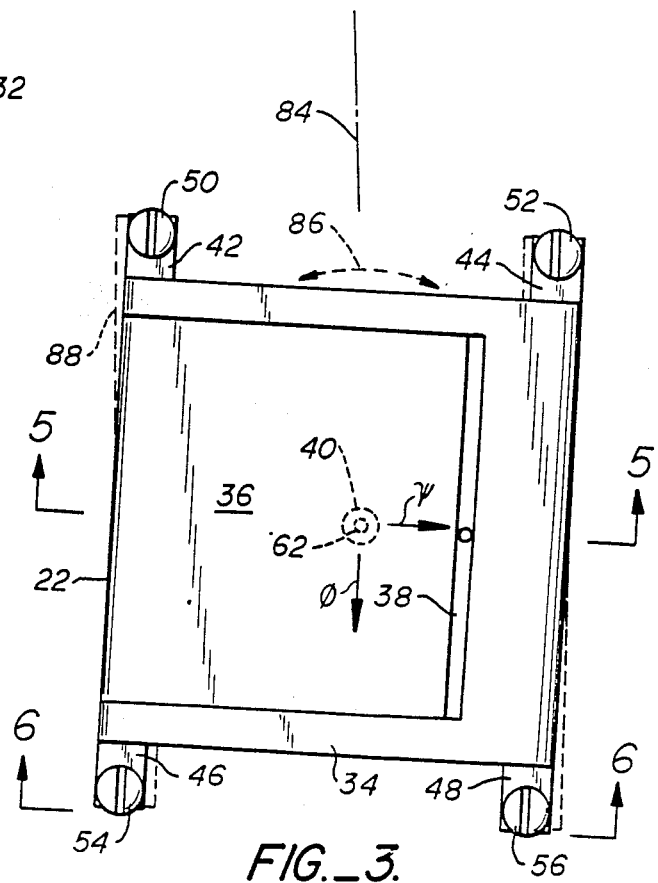
FIG._3.

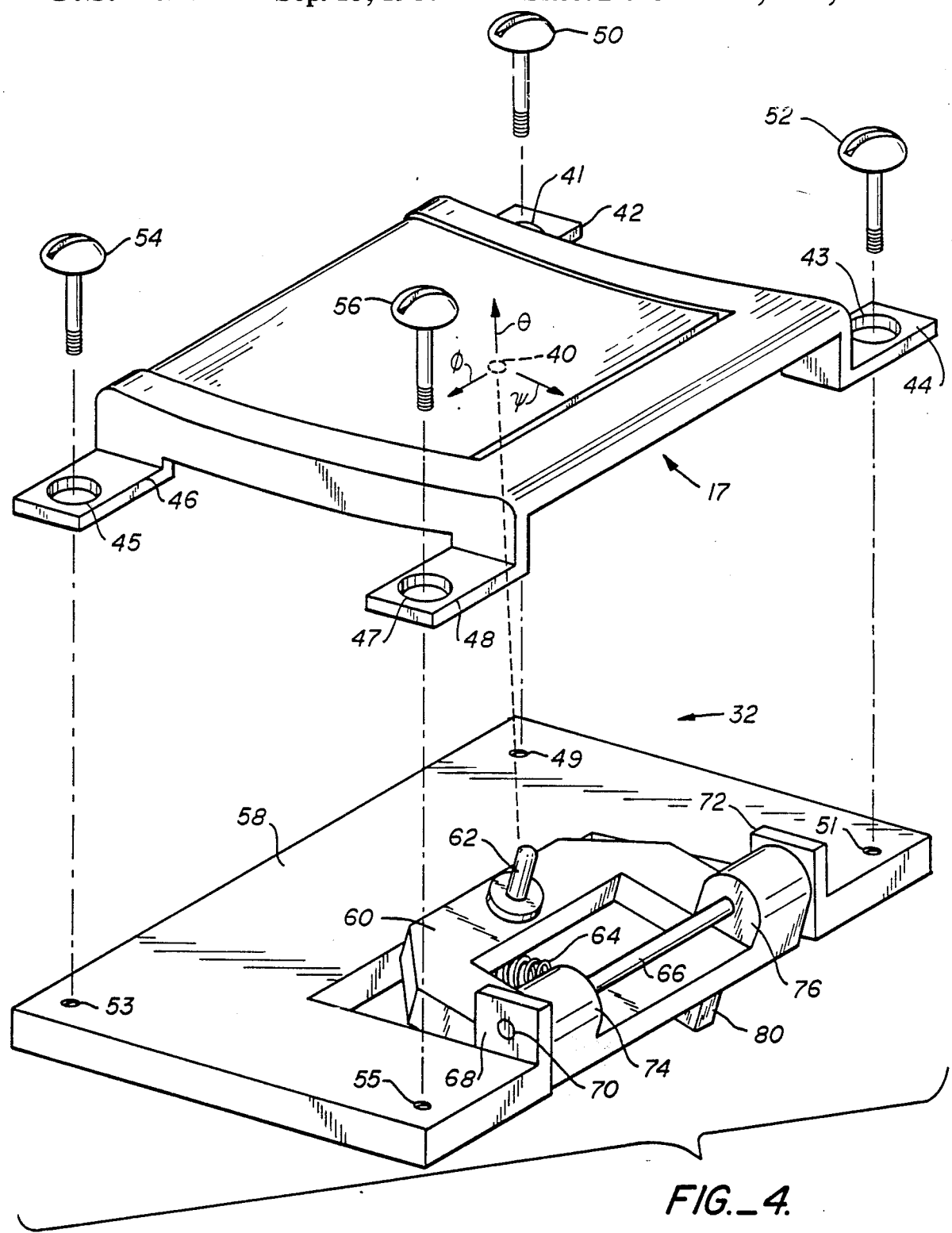
FIG._4.

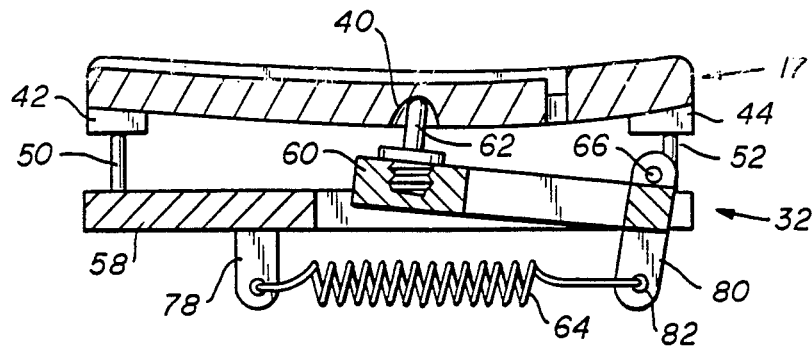
FIG._5.
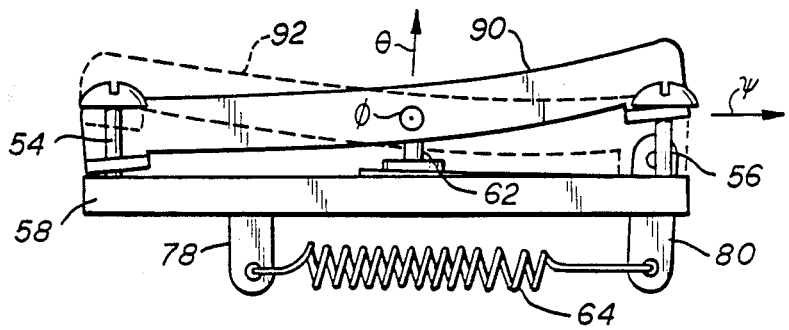
FIG._6.
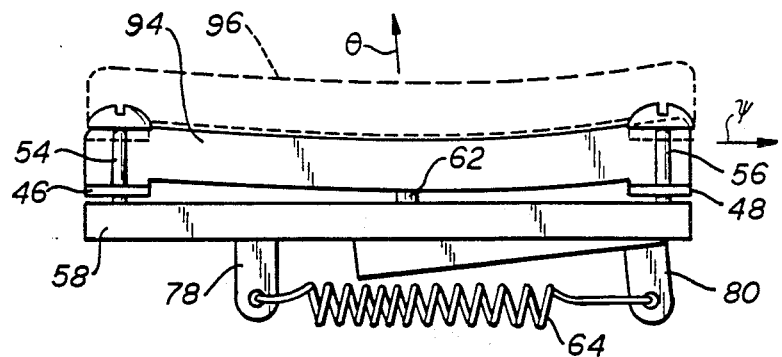
FIG._7.

SELF-SEATING TONING SHOE FOR ELECTROSTATIC DRUM PRINTERS

CROSS REFERENCE TO RELATED APPLICATIONS

This application is a continuation-in-part of U.S. patent application Ser. No. 796,872 filed Nov. 12, 1985, now U.S. Pat. No. 4,655,165, which is a continuation-in-part of U.S. patent application Ser. No. 763,040, filed Aug. 6, 1985.

TECHNICAL FIELD

The present invention relates to toning shoes for electrostatic drum printers and in particular to means in a toning shoe assembly for supporting a toning shoe against a sheet on a drum.

BACKGROUND ART

In electrostatic drum printing on sheets, such as in facsimile machines, an electrostatic latent image on the sheets is developed into a visible image, usually by applying a liquid suspension of toner particles to the sheets. The developer typically must remain in contact with the sheets for about one second to obtain adequate image contrast. Attempts have been made to increase the rate of printing by increasing the speed of rotation of the drum. However, this sometimes results in a loss of image contrast or density.

It is desirable to support toning shoes for applying liquid toner to sheets in such a way that allows a toner applicator to scan a sheet in a helical stripe pattern. As the drum rotates, the toning shoe is moved laterally parallel to the drum axis with the toner applicator contacting the supported sheet so that developer flowing in the applicator is directly applied to the sheet. A helical stripe scanning pattern results. When the sheet is laid out, the stripe pattern consists of adjacent columns on the developed sheet forming an image. An advantage of such a scanning method is that fluid developer or toner is applied to a localized area during drum rotation, corresponding to a helical stripe or column. Thus, a printer head need only write an electrostatic latent image in a helical stripe pattern and the expensive full width printer heads are unnecessary.

However, in order to properly scan in a helical pattern, the shoe must be placed against the drum slightly askew so that fluid developer applied by the shoe follows the helical stripe. Also, the sheet must be placed on the drum askew so that when it is finally laid out, the image is straight relative to the edges of the sheet. Unfortunately, the toner applicator may not tend to seat properly against the sheet under these conditions. One side of the applicator may be closer to the sheet than an opposite side causing uneven development and excessive leakage of developer. Differences in applicator spacing from the sheet on the order of a mil can adversely affect image quality. Uneven applicator pressure may also cause image smearing, background marking, and actual damage to the electrographic paper surface. An uneven drum surface may also cause improper seating of the shoe.

It is an object of the present invention to provide a toner applicator assembly which can seat properly against a sheet on a drum during helical scanning operation.

DISCLOSURE OF THE INVENTION

The above object has been met with a self-seating toning shoe which is movable relative to a normal orientation with three degrees of freedom. A "toning shoe" of the present invention is a type of toner applicator, resembling a tiny dish, having raised peripheral edges, which conform to a supported sheet. The shoe has a central recessed electrode bounded by the peripheral edges where a thin layer of flowing toner resides. A spillway is defined at the lowest peripheral edge of the shoe.

The toning shoe described herein is capable, of automatically adjusting its orientation to match the orientation of the drum as the shoe helically scans the sheet. This self-seating is accomplished by biasing the shoe only at a single point or region on the shoe.

To accomplish this feat, a lever body is pivotally mounted to a base fixed relative to a drum supporting a sheet. A pin on one end of the lever body engages a detent in a back of the shoe. A spring attaches to two downwardly depending tabs, one of which is fixed to the base, the other of which is near the opposite end of the lever body from the pin. The spring applies a torque to the lever body causing the pin to push against the shoe. The shoe is loosely secured to the base by screws partially inserted into the base so as to define a limit of forward movement of the shoe.

The toning shoe is in communication with a supply of fluid developer for applying the developer to a sheet carrying a latent image. The normal orientation of the shoe is askew with respect to the rotation axis of the drum so that the fluid developer applied by the shoe follows the helical stripe pattern made during scanning. The shoe is movable up to about one degree from this normal orientation with respect to each of the three degrees of freedom, the movement occuring automatically during scanning so as to properly seat the shoe against the sheet. A drying roller, spaced from the shoe, removes excess developer from the sheet. This excess developer is returned to the supply of fluid developer by a scraper blade contacting the drying roller and by a drain, disposed to receive the developer removed from the roller by the blade, and in communication with the supply of developer.

An advantage of the toning shoe assembly of the the present invention is that the toning shoe is automatically self-seating so as to adjust to the orientation of the sheet immediately adjacent to the shoe. Thus, improper seating due to the skew of shoe and sheet or to an uneven drum surface are prevented. The resulting developed sheet has more even development and better image quality than prior assemblies. The new assembly is also easier to manufacture since numerous parts and adjustments are eliminated.

BRIEF DESCRIPTION OF THE DRAWINGS

FIG. 1 is a simplified perspective view of a drum supported sheet and toning shoe assembly in accord with the present invention.

FIG. 2 is a side plan view of a sheet-supporting, rotating drum with a print head and toning shoe assembly.

FIG. 3 is a front view of a toning shoe in accord with the present invention illustrating a first degree of freedom for shoe movement.

FIG. 4 is a perspective view of a toning shoe with a shoe biasing mechanism in accord with the present invention.

FIG. 5 is a side sectional view of the toning shoe and shoe biasing mechanism of FIG. 4 taken along the line 5—5 in FIG. 3.

FIG. 6 is a side plan view of the toning shoe and shoe biasing mechanism of FIG. 4 taken along the line 6—6 in FIG. 3 and illustrating a second degree of freedom for shoe movement.

FIG. 7 is the side plan view of FIG. 6 illustrating a third degree of freedom for shoe movement.

BEST MODE FOR CARRYING OUT THE INVENTION

With reference to FIG. 1, drum 11 may be seen supporting a sheet of paper 13 for rotation. An axle 14 located on the longitudinal axis Z through the center of drum 11 supports the drum and transmits rotational power from a motor, not shown. While the drum rotates in the direction of arrow A, its axle 14 is fixed and so the drum does not translate laterally, only rotationally. An electrostatic head, for creating an electrostatic latent image, is in contact with the paper 13 at location 15. The head is translated laterally, parallel to the longitudinal axis Z of the drum 11. The head has a forward edge in contact with the sheet 13, with a linear array of 1024 wires forming charging elements in very close proximity to the sheet 13. The number of wires may range between 100 and 10,000. Sheet 13 is coated so that it is a charge retaining dielectric medium. Such sheets are commercially available, for example "Electrographic Paper" sold by Crown Zellerbach Corporation. The drum operates at electrical ground or at a positive potential. The charging elements are at a negative potential of 400 to 600 volts relative to the drum. Polarities may be reversed. No electrical current is intended to flow through the paper coating.

Although the preferred embodiment of the invention involves toning of electrostatic latent images on a sheet, other types of latent image, in non-electrostatic media, could also be developed. For non-electrostatic media, the electrodes just described herein would not be needed.

A toning shoe 17, part of a toning shoe assembly 18, following head at location 15, applies liquid toner to the latent image existing in the charge pattern deposited onto the sheet for developing the image. The head and toning shoe move together laterally and continuously so that a helical stripe pattern 19, indicated by dashed lines, is traced on sheet 13 by the relative motion of the head and shoe on the one hand and the drum on the other hand. Toning shoe 17 supplies fluid developer or toner locally to the sheet on the stripe 19. A drying roller is used downstream of the toning shoe to remove excess developer from the sheet.

In FIG. 2, the drum 11 is seen to be rotating about rotation axis Z in the direction indicated by the arrow A. The diameter of drum 11 is approximately 12 inches and its width is wider than sheets to be supported. The surface of the drum, extending from slightly inside the region of where paper is to be supported may be slightly relieved to prevent edge wetting when using fluid developers. The drum may have a pair of vacuum channels 27 and 29 which are passages embedded in the drum having pumped apertures in a groove 31 on the drum's surface for holding sheet 13. Preferably, the channels should be spaced in a groove 31 to secure the top and bottom edges of a sheet. Channels 27 and 29 are evacuated by means of a vacuum pump, not shown.

The electrostatic head 20 is in mechanical contact with a paper sheet mounted on the drum, applying charge thereto. Head 20 and toner shoe assembly 18 are supported on a carrier assembly, not shown, which is connected to a lead screw. A toning shoe 17, having an arcuate peripheral shape facing the drum applies toner to a localized area corresponding to a column or a latent image stripe. The latent image created by the head 20 is thus toned and formed into a visible image.

The position of the toning shoe is one very closely spaced to sheet 13, being biased by a single point biasing mechanism 32 of assembly 18. The single point biasing mechanism urges the shoe against the paper surface so that a raised peripheral edge or rim thereof is held against the paper on the drum. Toning shoe 17 is in communication with a supply of fluid developer via an inlet tube 26. Toner applied at the upper portion of shoe 17, is allowed to flow downwards between the shoe and the sheet, and then fall past a spillway 22 at the bottom of shoe 17 into a sump 23 for collection through drain tube 24. New developer is supplied through the inlet tube 26, and injected into the shoe for application to the sheet. A drying roller 28 is seen to be carried within the same housing as the shoe and contacts drum 11 for removing excess developer. Once the excess is removed, it is scraped from the drying roller by a scraper blade 30. Again, excess developer falls into the sump 23 for collection and returning of the developer to the supply.

In FIG. 3, a detail of the toning shoe is seen. The shoe has a U-shaped peripheral edge or rim 34 with a base, opposed parallel arms and an open spillway 22 opposite the base. Within the boundary formed by rim 34 is a central recessed electrode region 36, less than 10 mils (250 microns) and typically about 4 or 5 mils (100 to 125 microns) deep. The raised peripheral edge or rim 34 is brought into contact with a sheet being scanned. Rim 34 has an arcuate shape facing the drum with a radius of curvature which equals the combined radius of the drum with sheet, typically about $5\frac{7}{8}$ inches (14.9 cm). The rim is about three sixteenths inch wide on opposed sides and about one-half inch wide at the base which is seen as the upper or leading edge. The rim is polished to a high degree of accuracy to assure a close fit when the shoe is properly seated against the sheet on the drum, thereby confining developer to a localized area with little, if any, leakage. The recessed region 36 is typically about 2.56 inches wide and about 2 inches long. A developer slit 38, near the leading edge, applies developer onto a charged sheet carrying a latent image, immediately below the head. Typically, developer is injected under pressure, about 1.5 psi, at a rate of 0.05 gallons per minute. The developer is allowed to flow through the recessed area 36 to spillway 22 defined in the lower edge and is then collected for recycling. Typically, developer flows in a thin film at a speed of about 15 inches per second through the space created between recessed region 36 and the sheet.

With reference to FIGS. 3, 4 and 5, toning shoe 17 is biased against a sheet by a single point biasing mechanism 32. A detent 40 is provided in the back of toning shoe 17 for receiving a pin 62 of the biasing mechanism 32. Toning shoe 17 is also loosely secured to biasing mechanism 32 by screws 50, 52, 54 and 56. Extensions or tabs 42, 44, 46 and 48 extend out from shoe 17 and have holes 41, 43, 45 and 47 respectively. Screws 50, 52, 54 and 56 fit through holes 41, 43, 45 and 47 respectively and are partially inserted, i.e. screwed into, holes 49, 51, 53 and 55 respectively in a base 58 of biasing mechanism 32. Screws are preferred because the amount of insertion can be adjusted. Alternatively, nails, rivets and the like can be used. The diameter of holes 41, 43, 45 and 47 should be larger than that of the shafts of the screws, but less than the diameter of the heads of the screws. This gives the toning shoe a degree of freedom to rotate about an axis, indicated by arrow $\theta$, generally perpendicular to the top surface of the shoe through detent 40. Toning shoe 17 is also free to rotate about two other axes, indicated by arrows $\phi$ and $\Psi$. The three axes $\theta$, $\phi$ and $\Psi$ are mutually orthogonal. These rotational degrees of freedom are discussed further below.

The screws 50, 52, 54 and 56 define a limit of forward movement of the shoe. Biasing mechanism 32 biases toning shoe 17 forward, i.e. against a sheet. The forward limit is reached when tabs 42, 44, 46 and 48 on toning shoe 17 reach the heads of screws 50, 52, 54 and 56. Since the head diameter is larger than the diameter of the holes 41, 43, 45 and 47, the toning shoe is prevented from moving beyond this limit. The limit is not ordinarily reached during operation when the shoe is scanning a sheet on a drum, but when, for example, the shoe is retracted for cleaning, the limit of forward movement defined by the screws prevents the toning shoe from falling off. Typically, this limit is about $\frac{1}{4}$ inch from base 58. The screws 50, 52, 54 and 56 may also be adjusted to limit the forward travel of the shoe when the shoe crosses over the groove in the drum. This makes for a smooth transition from the trailing edge to the leading edge of the paper.

Biasing mechanism 32 comprises a base 58, a lever body 60 pivotally mounted to base 58, a pin 62 on one end of lever body 60 and a spring 64 for applying a torque to lever body 60 so as to push pin 62 against toning shoe 17. Lever body 60 is mounted to base 58 by an axle 66. Axle 66 connects to base 58 through an upwardly extending block 68 at aperture 70 and also through another aperture, not seen, in an opposing upwardly extending block 72. Axle 66 connects to lever body 60 through apertures in tabs 74 and 76 adjacent to blocks 68 and 72 respectively. Spring 64 attaches to two downwardly depending tabs 78 and 80. Tab 78 is fixed to base 58. Tab 80 forms part of lever body 60 and is located on the opposite side of axle 66 from pin 62. Preferably, tab 80 is oriented downward and generally perpendicular to the portion of lever body 60 between axle 66 and pin 62. When spring 64 exerts a pulling force on tab 80, the lever body pivots so as to push pin 62 upwards against the back of toning shoe 17.

Typically, biasing mechanism 32 exerts a force of about five pounds against toning shoe 17. Pin 62 is typically $\frac{1}{4}$ inch long, the distance between pin 62 and axle 66 is typically about one inch, and the distance between axle 66 and the point 82 of spring connection to tab 80 is about $\frac{1}{2}$ inch. Spring 64 exerts a typical pulling force on tab 80 of about ten pounds.

With reference to FIGS. 3, 5 and 7, toning shoe 17 has a normal orientation for seating against a sheet on a drum. As seen in FIG. 3, this normal orientation is askew relative to the drum's rotation axis, represented by line 84 in FIG. 3. Typically, developer slit 38 in toning shoe 17, which represents the leading edge for applying developer to a helical stripe of the sheet, is approximately four degrees askew relative to drum axis 84. Rim 34 of toning shoe 17 has a skewed arcuate shape so as to fit closely against a sheet on the drum when toning shoe 17 is in this askew normal orientation. Preferably, detent 40 is located near the center of fluid pressure of toning shoe 17, so that pin 62 supports the shoe in its normal orientation as on a balance. However, the precise location of detent 40 is not highly critical.

Toning shoe 17 is movable on pin 62 relative to the normal orientation with three degrees of freedom. Pin 62 thus acts as a gimbal for toning shoe 17. A first degree of freedom is rotation about an axis, indicated by arrow $\theta$, generally perpendicular to the top surface 36 of shoe 17 through detent 40, as seen in FIGS. 3 and 4. Toning shoe 17 may rotate either clockwise for increased skew or counterclockwise for decreased skew, as indicated by arrows 86 in FIG. 3. A phantom toning shoe 88 is seen in FIG. 3 which is rotated counterclockwise up to the maximum allowable limit of motion. This limit may range from 0.1 to four degrees away from the normal orientation but is typically about one or two degrees away from the normal orientation.

In FIG. 6, a second degree of freedom of movement is rotation on an axis $\phi$ parallel to the rotation axis of the drum about pin 62. This axis is out of the page through the circled point indicated by $\phi$ in FIG. 6, and is also indicated by arrow $\phi$ in FIGS. 3 and 4. The toning shoe may rotate toward a more inclined orientation, shown by the solid toning shoe 90, or may rotate toward a less inclined orientation, shown by the phantom toning shoe 92. In either case, the toning shoe is movable up to a maximum limit in the range from one to eight degrees with respect to the normal orientation. This limit is typically about five degrees.

In FIG. 7, a third degree of freedom of movement is rotation on an axis, indicated by arrow $\Psi$, tangent of the circumference of the drum about pin 62 in the direction of drum rotation. The toning shoe may thus rotate toward a leftward orientation, shown by the solid toning shoe 94. In this leftward orientation, tabs 46 and 48 are lower on their screws 54 and 56, i.e. are closer to base 58, than the other two tabs 42 and 44 shown in FIG. 3. The toning shoe may also rotate toward a rightward orientation, shown by the phantom toning shoe 96 in FIG. 7, in which tabs 46 and 48 are further from base 58 than tabs 42 and 44. As with the first two rotational degrees of freedom about axes $\theta$ and $\phi$, the toning shoe is movable about axis $\Psi$ up to a maximum limit with respect to the normal orientation. Again, as with rotation about axis $\phi$, this limit is typically about five degrees.

The toning shoe 17 described above is movable simultaneously in all of the rotational degrees of freedom about three mutually orthogonal axes through the single point of biasing so as to be responsive to the local orientation of the sheet on the drum. This occurs automatically as the biasing mechanism 32 biases the shoe against the sheet. Thus the shoe is self-seating, and helical scanning is made possible without loss of image quality.

I claim:

1. A toning shoe assembly for an electrostatic drum printer comprising, a drum having a round outer circumferential surface capable of supporting a sheet carrying an electrostatic latent image, a toning shoe having a toning surface matching a region of the circumferential surface of the drum, with a raised outer periphery in contact with said sheet and a depressed central region in communication with a supply of fluid developer for applying the developer to the sheet, and means for positionally biasing said shoe against said sheet at a single point thereof, said shoe being movable relative to a normal orientation about first, second and third mutually orthogonal axes through said single point of said shoe so as to be responsive to the local orientation of said sheet on said drum.

2. The assembly of claim 1 wherein said biasing means comprises,
a base fixed relative to said drum,
a lever body pivotally mounted to said base,
a pin on one end of said lever body contacting a back of said shoe, and means for applying a torque to said lever body so as to cause said pin to push against said shoe.

3. The assembly of claim 2 wherein said torque applying means comprise,
a downwardly depending tab fixed to said base, and
a spring connected to said tab and to an end of said lever body opposite from said pin.

4. The assembly of claim 2 wherein said shoe is loosely secured to said base.

5. The assembly of claim 4 wherein screws partially inserted into said base define a limit of forward movement of said shoe.

6. The assembly of claim 2 wherein said pin engages a detent in said shoe.

7. The assembly of claim 1 wherein said first axis is perpendicular to said circumferential surface at said single point, said second axis is parallel to an axis of rotation of said drum, and said third axis is tangent to said circumferential surface at said single point in a direction of drum rotation.

8. The assembly of claim 1 wherein said shoe is movable about each of said mutually orthogonal axes up to a maximum limit from said normal orientation, said maximum limit being in a range from one-tenth to eight degrees.

9. The assembly of claim 1 wherein said shoe in said normal orientation is askew with respect to a rotation axis of said drum.

10. The assembly of claim 1 further comprising,
a drying roller spaced from said shoe for removing excess developer from said sheet, and
means for returning said excess developer to said supply.

11. The assembly of claim 10 wherein said means for returning excess developer to said supply comprises,
a scraper blade in developer removing contact with said drying roller, and
a drain in communication with said supply of fluid developer, said drain disposed to receive said excess developer from said blade.

12. A apparatus for applying fluid developer to a latent image on a sheet supported by a backing member comprising,
a toning shoe with raised peripheral edges conforming to the shape of a supported sheet bearing a latent image, said shoe having a central recessed area surrounded by said edges, said edges contacting said sheet and having an opening defined therein, said opening oriented downward forming a spillway,
means for injecting fluid developer into said recessed area thereby creating a flow of developer to said spillway,
means for positionally biasing said shoe against said sheet, said shoe being biased at a single point thereof and being movable relative to a normal orientation about first, second and third mutually orthogonal axes through said single points, said shoe being responsive to a local orientation of said sheet on said drum,
means for translating said shoe in a direction across said sheet, and p1 means for removing excess developer from said spillway and away from said sheet.

13. The apparatus of claim 12 wherein said sheet is supported on a rotatable drum.

14. The apparatus of claim 13 wherein said shoe in said normal orientation is askew with respect to a rotation axis of said drum.

15. The apparatus of claim 12 wherein said biasing means comprises,
a base fixed relative to said drum,
a lever body pivotally mounted to said base,
a pin on one end of said lever body contacting a back of said shoe, and means for applying a torque to said lever body so as to cause said pin to push against said shoe.

16. The assembly of claim 15 wherein said torque applying means comprise,
a downwardly depending tab fixed to said base, and
a spring connected to said tab and to an end of said lever body opposite from said pin.

17. The assembly of claim 15 wherein said shoe is movable about each of said mutually orthogonal axes up to a maximum limit from said normal position, said maximum limit being in a range from one-tenth to eight degrees.

18. The assembly of claim 15 wherein said shoe is loosely secured to said base.

19. The assembly of claim 18 wherein screws partially inserted into said base define a limit of forward movement of said shoe.

20. The assembly of claim 15 wherein said pin engages a detent in said shoe.

21. The assembly of claim 12 wherein said shoe in said normal orientation is askew with respect to a rotation axis of said drum.

22. The assembly of claim 12 further comprising,
a drying roller spaced from said shoe for removing excess developer from said sheet, and
means for returning said excess developer to said supply.

23. The assembly of claim 22 wherein said means for returning excess developer to said supply comprises,
a scraper blade in developer removing contact with said drying roller, and
a drain in communication with said supply of fluid developer, said drain disposed to receive said excess developer from said blade.

* * * * *

UNITED STATES PATENT AND TRADEMARK OFFICE
CERTIFICATE OF CORRECTION

PATENT NO.  : 4,693,206
DATED       : September 15, 1987
INVENTOR(S) : Gene F. Day It is certified that error appears in the above—identified patent and that said Letters Patent is hereby corrected as shown below:

Claim 12, column 8, lines 13-14, "means for translating said shoe
    in a direction across said sheet, and pl means for removing.."
    should read - -means for translating said shoe in a direction
    across said sheet, and- -.

Claim 12, column 8, lines 15-16 should be another subparagraph
    reading - -means for removing excess developer from said
    spillway and away from said sheet.- -.

Signed and Sealed this

Nineteenth Day of January, 1988

Attest:

DONALD J. QUIGG

Attesting Officer

Commissioner of Patents and Trademarks